United States Patent [19]

Kelsey et al.

[11] Patent Number: 4,733,569

[45] Date of Patent: Mar. 29, 1988

[54] MASS FLOW METER

[75] Inventors: Newton D. Kelsey, Dallas, Tex.; Martin Kane, Atlantic City, N.J.; Wayne Pratt, Scottsdale, Ariz.

[73] Assignee: K-Flow Division of Kane Steel Co., Inc., Millville, N.J.

[21] Appl. No.: 809,658

[22] Filed: Dec. 16, 1985

[51] Int. Cl.⁴ .............................................. G01F 1/84
[52] U.S. Cl. ................................................. 73/861.38
[58] Field of Search ........................ 73/861.37, 861.38

[56] References Cited

U.S. PATENT DOCUMENTS

| | | |
|---|---|---|
| Re. 31,450 | 11/1983 | Smith . |
| 2,624,198 | 1/1953 | Pearson . |
| 2,811,854 | 11/1957 | Powers . |
| 2,813,423 | 11/1957 | Altfillisch et al. . |
| 2,819,437 | 1/1958 | White . |
| 2,821,084 | 1/1958 | Altfillisch et al. . |
| 2,831,349 | 4/1958 | Altfillisch et al. . |
| 2,834,209 | 5/1958 | Jones et al. . |
| 2,865,201 | 12/1958 | Roth . |
| 3,087,325 | 4/1963 | Roth . |
| 3,108,475 | 10/1963 | Henderson . |
| 3,132,512 | 5/1964 | Roth . |
| 3,218,851 | 11/1965 | Sipin . |
| 3,261,205 | 7/1966 | Sipin . |
| 3,276,257 | 10/1966 | Roth . |
| 3,329,019 | 7/1967 | Sipin . |
| 3,355,944 | 12/1967 | Sipin . |
| 3,396,579 | 8/1968 | Souriau . |
| 3,456,491 | 7/1969 | Brockhaus . |
| 3,485,098 | 12/1969 | Sipin . |
| 3,896,619 | 7/1975 | Hunter et al. . |
| 3,927,565 | 12/1975 | Pavlin et al. . |
| 4,109,524 | 8/1978 | Smith . |
| 4,127,028 | 11/1978 | Cox et al. . |
| 4,187,721 | 2/1980 | Smith . |
| 4,192,184 | 3/1980 | Cox et al. . |
| 4,252,028 | 2/1981 | Smith et al. . |
| 4,311,054 | 1/1982 | Cox et al. . |
| 4,381,680 | 5/1983 | Shiota . |
| 4,422,338 | 12/1983 | Smith . |
| 4,444,059 | 4/1984 | Smith . |
| 4,470,294 | 9/1984 | Hamel . |
| 4,491,009 | 1/1985 | Ruesch . |
| 4,491,025 | 1/1985 | Smith et al. . |
| 4,559,833 | 12/1985 | Sipin . |

FOREIGN PATENT DOCUMENTS

| | | | |
|---|---|---|---|
| 149900 | 11/1961 | U.S.S.R. . | |
| 146982 | 4/1964 | U.S.S.R. . | |
| 0732672 | 5/1980 | U.S.S.R. | 73/861.38 |

OTHER PUBLICATIONS

Alan M. Young, "Coriolis-Based Mass Flow Meter", Dec. 1985–*Sensors Magazine*.
E. Dahlin, A. Young, R. Blake, C. Guggenheim, S. Kaiser and A. Levien, "Mass Flow Meter"–*Measurement and Controls* magazine.
W. Bye, "Mass Flow Measured with Vibration Generators", Feb. 1957–*Fluid Handling* magazine.
Danfoss Co., "MASSFLO".
Exac Corp., Digital Precision Mass Flow Meter.
Smith Meter Co., "S-MASS", 1985.
Micro Motion, Model D25.
Instrument Engineers Handbook (Rev. Ed.), Mass Flow Meters (pp. 87-90), 1982.

*Primary Examiner*—Herbert Goldstein
*Attorney, Agent, or Firm*—Seidel, Gonda, Goldhasmmer & Abbott

[57] ABSTRACT

A mass flow meter for placement in line within a preexisting process line. The flow meter having a conduit forming a substantially free floating spiral or circular loop which is symmetrical about the axis line defined by the process line. A driving transducer extending radially from a bracket on a support beam which is positioned along the axis line and attached to the inlet and outlet end of the conduit. The driver imparting an alternating deflection to the loop which is substantially perpendicular to the fluid flow within the loop and parallel to the axis line. Sensing transducers are positioned along the periphery of the loop, displaced equidistant from the driving transducer along its circumference for determining the deflection signature of the loop. The deflection of the loop in response to the fluid reaction forces is measured without reference to a specific fixed axis or position of the loop. This acceleration signature is correlated to the mass flow rate of the fluid through the conduit.

14 Claims, 8 Drawing Figures

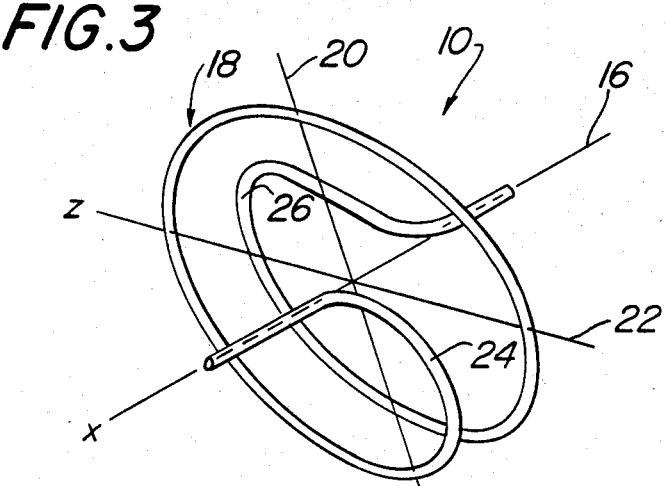
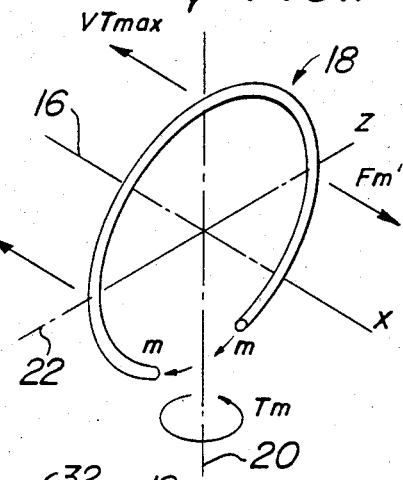
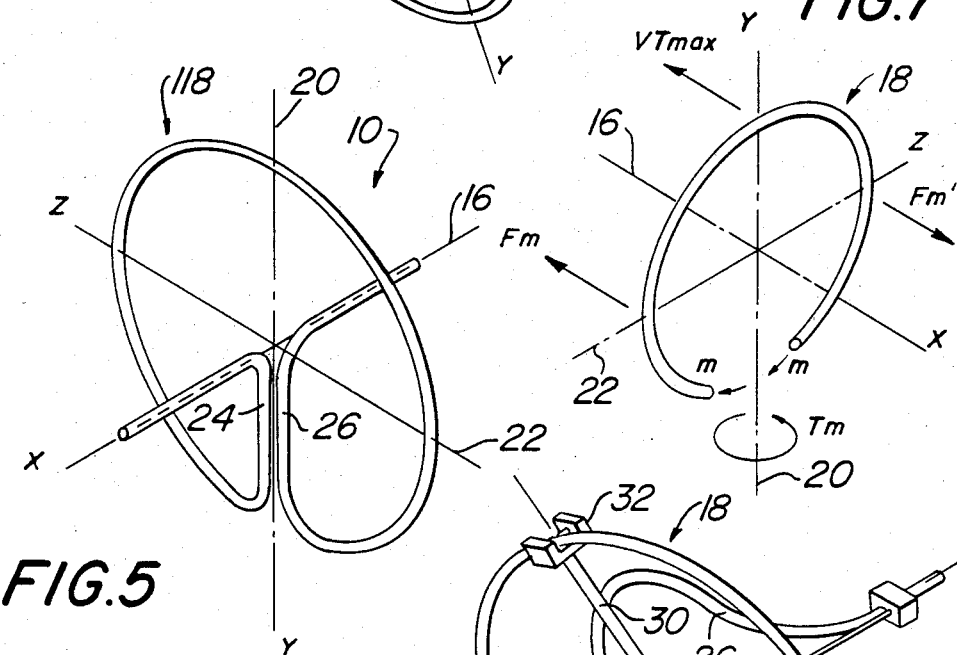
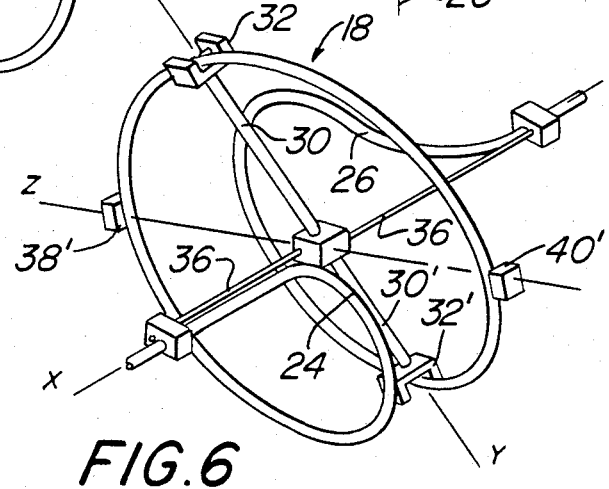

MASS FLOW METER

BRIEF SUMMARY OF THE INVENTION

This invention relates to a mass flow meter which measures Coriolis or gyroscopic type reaction forces to determine the mass flow of a fluid or slurry within a conduit. Paricularly this invention incorporates a conduit loop having an inlet end and an outlet end positioned substantially along a single axis which is typically defined by a line of existing piping. The loop is alternately deflected in a direction orthogonal to the flow within the conduit. The alternating deflections or oscillations of the conduit imparts a transverse angular momentum to the fluid flowing through the loop. The fluid reacts with a repetitive and measurable force against the wall of the conduit causing a transverse deflection of the loop. The reaction of the fluid on the conduit is proportional to the magnitude and direction of the fluid mass flow.

BACKGROUND OF THE INVENTION

The invention relates to a mass flow metering device which operates within a defined fluid stream. Such metering devices are desirably constructed without internal moving parts which may be contaminated by the fluid within the stream. The principle of the invention is based on the known fact that a fluid flowing through a conduit or tube which experiences an acceleration orthoginal to the direction of its flow, will interact with the conduit wall with a reaction force which is directly proportional to the mass flow of the fluid within the conduit. The reaction force generated by the fluid against the conduit is generally referred to as a Coriolis force.

Various issued patents describe mass flow meters which utilized the measurement of the fluid reaction forces to determine the mass flow rate. These patents teach various conduit designs and configurations, various means for measuring the reaction forces and various ways of determing the mass flow.

Roth, U.S. Pat. No. 2,865,201, teaches a gyroscopic type flow meter which directly measures the magnitude of the reaction forces on the conduit. Since these forces are created by a continuous oscillation of the conduit, the Roth design is impractical. Similar conduit designs are found in Roth, U.S. Pat. No. 3,276,257, and Henderson, U.S. Pat. No. 3,108,475. The sensitivity of the reaction force measurement in all of these conduit designs is greatly influenced by the oscillatory fluctuations of the meter conduit and by environmental vibrations.

A series of patents, U.S. Pat. Nos. 3,261,205, 3,329,019 and 3,355,944, to Sipin teach the measurement of the fluid reaction forces due to an imparted transverse vibration on a straight conduit, a curved conduit and a U-shaped conduit. The earlier conduit designs in this series attempt to directly measure the reaction forces on the conduit and, therefore, were subject to the same substantial sensitivity deficiencies due to external vibrational influences found in the patents discussed above. In the curved and U-shaped conduit designs, the imparted oscillation creates a torsional bending moment about an, ideally, fixed axis. In the U-shaped design the sensors were required to be referenced to the actual motion of the tube and to a fixed or stationary position. In a working environment each of the Sipin conduit designs are extremely noisy in operation and, basically, ineffective due to inacuracies created by vibrations of the flow meter and the references of the sensors tube unrelated to the fluid reaction force. The drivers, which impart the oscillatory motion to the conduit, are attached to an external casing of the meter. The internal and external vibrational effects causes substantial output deficiencies in the reaction force sensing means and, therefore, greatly effect the calculation of the mass flow rate.

In Smith, U.S. Pat. No. 4,109,524, an attempt was made to separate the oscillation means from the force measurement system. The flow meter disclosed in this patent is cumbersome in application and does not effectively reduce the vibrational effects on the reaction force sensing means.

The first patent to recognize the need for vibrational and noise immunity on the sensing means is Cox et al, U.S. Pat. No. 4,127,028. In Cox each reaction force sensor is referenced to two adjacent cantalevered tubes. The two tubes are oscillated simultaneously in opposite relative directions and, ideally, at the same resonance. The external vibrational influences on the two tubes are intended to be self-cancelling when viewed by the sensors referenced to both tubes. However, the driving means in this design is mounted on a long cantilever arm and includes a large weight at the end of the arm. This structure produces an extremely low vibrational resonance and greatly limits the ability of the cantalevered tube to oscillate about a fixed reference axis. Environmentally induced vibrations, as well as vibrational effects of the driving means continue to influence the Cox measurement sensitivity by affecting the positioning of the tubes differently.

The same deficiencies found in Cox '028 in its reaction force sensing are found in the Smith, U.S. Pat. No. 4,187,721 and its corresponding Reissue No. 31,450. Smith, U.S. Pat. No. 4,422,338, attempts to enhance the sensitivity of the meter by using a frame which surrounds the oscillating tube to act as a fixed sensor reference. In addition, the Smith '338 design utilizes velocity type sensors to create an adjoining reference system such that the zero or reference position of linear type sensors, which record the tube motion due to the fluid reaction forces, is continually adjusted in response to vibrational influences on the meter. However, since the rotational axis of the cantalevered flow meter tube and mounting frame is not stationary, due to the vibrational effects on the meter structure. The effect of adjusting the reference plane of the reaction force sensors, therefore, is minimal. Commonly assigned copending application Ser. No. 809,659 submitted to the Patent Office on Dec 16, 1985 teaches a conduit design which is not cantilevered and is driven preferably directly along the axial line of the pipeline of the defined fluid stream. The structure of this invention overcomes many of the prior art deficiencies in sensing.

It is important to note that in all of the known flow meter designs, as long there is an increasing gradient of transverse velocity from the entrance of the flow meter tube to a point of maximum velocity and a decreasing transverse velocity gradient from the maximum point to the outlet, that there will be a decreasing transverse reaction or Coriolis force gradient in one direction from the inlet to the point of maximum deflection or velocity and a transverse force gradient in the opposite direction from the maximum point to the outlet. The measurement or sensing of these reaction forces created by the Coriolis reaction of the fluid maybe correlated to the mass flow rate within the tube.

The prior art of this type flow meter exhibits significant deficiencies in their determination of the fluid reaction on the tube. These deficiencies are directly related to the geometry of the meter and its sensing technique. It is difficult to isolate the oscillating motion of the flow meter tube created by the fluid reaction forces due to the environmental vibrations encountered by the conduit (or vibrations created by the meter itself).

The typical industrial environment in which the flow meter operates is subject to substantial vibrational influences due to the presence of rotating machinery within the process line in which the meter is located. External temperature influences, as well as, internal pressure and temperature fluctuations adversely affect the reliability and the sensitivity of the known meter designs.

Additional problems which effect the sensitivity of this type flow meter relate to the utilization of these instruments "on line" within an existing piping system in an industrial process. Impedance of the fluid flow caused by the flow meter may significantly hamper the efficiency of the industrial process.

Furthermore, flow meters of this type have a tendency to become complex, bulky and expensive, all of which adversely affect the applicability of the Coriolis or gyroscopic measurement technique in many instances.

OBJECT OF THE INVENTION

It is therefore an object of this invention to provide a mass flow meter that overcomes some of the deficiencies of the prior art and which may be easily positioned "on-line" within an existing pipe or process line.

It is also the object of this invention to provide a flow meter structure which effectively increases the measurablility of the fluid reaction force on the conduit while eliminating environmental and structural limitations that affect the reaction force sensing and its correlation to the mass flow rate.

It is a further intent of the present invention to provide a mass flow meter that is substantially insensitive to temperature and pressure fluctuations and to typical industrial environmental vibrations.

SUMMARY OF THE INVENTION

The preferred embodiment of the present invention incorporates a flow meter conduit or tube positioned within a pre-existing pipe line or defined fluid stream having an inlet and an outlet end arranged axially along the pipe line of the fluid stream. Intermediate between the inlet and outlet, the flow meter tube is spiraled symmetrically about the axis line such that the conduit forms a substantially free floating loop. In one embodiment of the invention the loop lies in a plane substantially perpendicular to the first axis (the plane being defined by the "Z" and the "Y" axes). The loop is free floating having no defined axis of rotation and is relatively free of restrictions or constraints along all points of its periphery.

A fluid stream enters through the inlet of the meter, proceeds around the loop (such that it is traveling in a direction perpendicular to the axis of its input flow), exits the loop through the outlet and returns into the defined fluid stream. A support beam, lying substantially along the first axis and passing through the geometric center of the loop is secured adjacent to the inlet and outlet ends of the flow meter conduit. A mounting bracket secured to the support beam incorporates radially extending arms which position a single or, in the alternative, a pair of driving transducer(s) on the periphery of the loop. Each driver imparts an oscillating deflection to the loop in a direction substantially perpendicular to the flow within the loop and parallel to the X-axis. Sensing transducers may be mounted radially from the bracket and positioned adjacent to the outside edge of the loop. Sensors may also be mounted directly onto the periphery of the loop without support from the brackets. Two or more sensors on opposite sides of the center oscillation are used to process and correlate the information relating to the deflection signature of the conduit loop due to the reaction forces of the fluid on the conduit.

The radially positioned sensing transducers produce serial information as to the specific displacement cycle of the conduit resulting from the fluid reaction forces. This information can be correlated in the microprocessor in any convenient manner to provide an accurate determination of the mass flow rate.

The support beam may be rigidly mounted or have a spring damping arrangement to reduce vibrations which may be translated to and from the mounting system. However, due to the radial sensing configuration contemplated by this invention, the external vibration translated to the beam and mounting bracket are effectively self cancelling.

A free floating loop arrangement has the advantage of reducing the spring constant of the conduit which acts to resists deflection of the loop due to the fluid reaction forces. This spring constant reduction increases the sensitivity of the meter. The sensing capabilities of the meter are also increased, as compared to the known designs, since the flow meter loop is not cantalevered or subject to an extreme bending moment about a fixed mounting position. The softer spring constant, also, permits the use of heavier or stronger wall materials when designing the flow meter conduit, increasing longevity and permitting use with higher operating pressures and temperatures. The symmetrical positioning of the loop also optimizes the center of gravity about its central axis.

A free floating loop, as compared to a cantalevered U-shaped form, eliminates the need for measurements about a fixed rotational axis. The reactions of the flow meter conduit, as measured by the sensors, are not referenced to a specific fixed structure or axis and, therefore, vibrations created by the structure or by environmental machinery do not alter a fixed reference location. Additionally, radial positioning of the drivers and the sensors effectively cancel these external vibrations and, therefore, do not create a significant effect on the sensor measurements.

The acceleration imparted to the fluid by the driver is, desirably, at a maximum at a point along the axis line defined fluid stream and is directed parallel to that line. Common mode vibrations from the driver are translated axially through this system. Additional vibrational influences do not substantially affect the fluid flow before or after passing through into the flow meter.

Also, the transverse mounting of the loop is substantially immune to noise and other translated vibrational forces. Transverse mounting with respect to the fluid stream creates a very stable plane, such that no one portion of the flow meter conduit is subject a to greater vibrational effect than another.

In line mounting of the flow meter conduit, also, brings the inlet and outlet of the flow meter closer together. Therefore, the conduit contemplated by this invention substantially reduces the size of the meter between the inlet and the outlet as well as the size of the casting of the covers and mounting brackets required.

Further objects and advantages will become apparent to those skilled in the art by particularly describing the preferred embodiments of the invention.

For the purpose of illustrating the invention, there is shown in the drawings a number of forms which are presently preferred; it being understood, however, that this invention is not limited to the precise arrangements and instrumentalities shown.

BRIEF DESCRIPTION OF THE DRAWINGS

FIG. 3 is a perspective view of the embodiment in FIG. 1 referencing a three-dimensional coordinate system.

FIG. 5 shows an alternate embodiment of the flow meter to that shown in FIGS. 1, 2 and 3.

FIG. 6 shows a two driver embodiment of the flow meter shown in FIG. 1.

FIG. 7 shows the relative reaction forces effecting the conduit loop.

DETAILED DESCRIPTION OF THE DRAWINGS

The preferred embodiment of the flow meter of this invention comprises a conduit or tube which is generally referenced by the numeral 10. This conduit 10 is to be positioned "in line" within a defined fluid stream or pre-existing pipe line (not shown).

Figure 1:
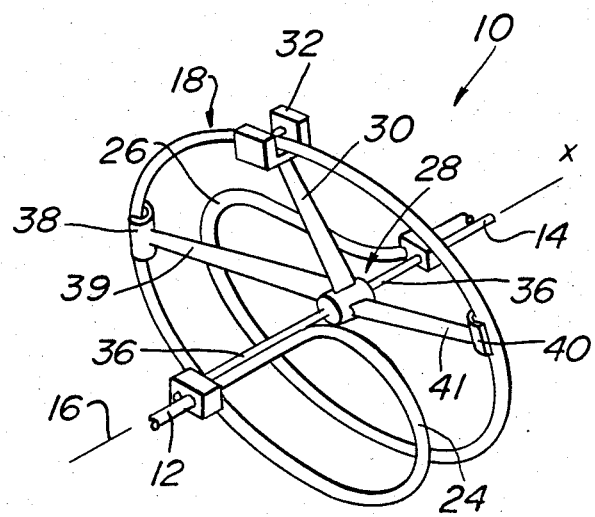
FIG. 1 is a perspective view of a single loop embodiment in accordance with the teachings of the present invention.
Figure 2:
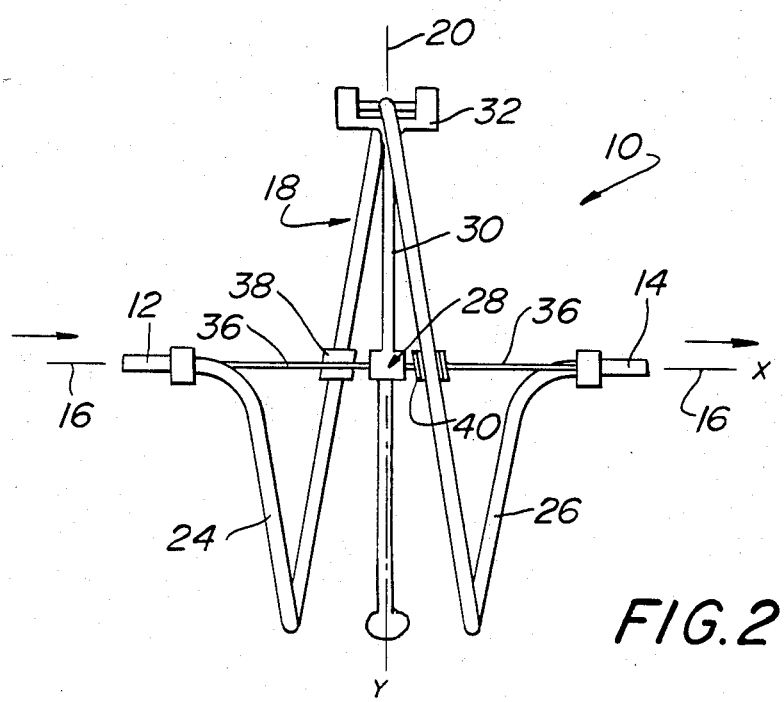
FIG. 2 is a side view of the embodiment in FIG. 1.

Referring to FIGS. 1–3, the conduit 10 is provided with an inlet 12 and an outlet 14 at respective ends. The inlet 12 and outlet 14 are positioned substantially along a single axial line which is defined by the pre-existing pipe line and is referenced as the X-axis 16. Intermediate of the inlet 12 and outlet 14 the conduit 10 is formed into a spiral which, as shown, forms a loop 18. The referenced coordinate system referred to in this text is shown in FIG. 3. The Y-axis is referred to by the numeral 20 and the Z-axis being 22 in the three dimensional system shown.

The inlet portion 24 of the conduit 10 between the inlet 12 and loop 18 and its corresponding outlet portion 26 from the loop 18 to the outlet 14 are formed through the use of gently bent portions which turn the direction of the fluid flow approximately 90° (when viewed from above the X-Z plane). These inlet and outlet portions 24, 26 of the spiral design in FIGS. 1, 2 and 3 are formed to minimize restriction of the fluid flow through the conduit 10. The actual shape of these portions 24, 26 will vary depending on conduit diameter, the intended working fluid and the length of the spiral of the loop along the X-axis 16.

A mounting bracket 28 is positioned at the center of the loop 18. Supporting arm 30 extends radially from the mounting bracket 28 and is positioned substantially along the Y-axis 20 to a position directly adjacent to the periphery of the loop 18. A driving transducer 32 is mounted on the end of support arm 30. The driver 32 may be of any conventional design such as an electromagnetic coil excited by an alternating current (See FIG. 2). The driver 32 when excited to oscillate the loop 18, imparts a deflection to the loop 18 substantially parallel to the X-axis 16. The oscillation of the loop 18 induces the alternating change in the angular momentum of the fluid within the conduit 10. Alternately, driver 32 substantially deflects the loop 18 perpendicular to the Y-Z plane and about the Z-axis 22, although these references are not critical to the invention.

The mounting bracket 28 is supported on a beam 36 which passes through the center of the loop 18 and extends substantially along the X-axis 16 and is attached to the inlet 12 and the outlet 14. This structure references the driver 32 to a single point which is substantially at the center of the loop 18.

The loop 18 is substantially symmetrical about the reference beam 36 (and the X-axis 16) and, therefore, automatically compensates for thermal expansion of the conduit 10 due to temperature variations in the fluid or the environment. Expansion or contraction of the conduit loop 18 or the bent portions 24, 26 will result in equivalent changes in the loop's dimensions along its periphery and its position with respect to the X-axis 16.

It should be noted that the plane of the loop 18 need not be perpendicular to the X-axis 16 (FIGS. 1, 2 and 3). The only limitation is that the driver 32 deflects the conduit 10 in a direction which is substantially perpendicular to the flow within the loop 18 and at the same time parallel to the X-axis 16.

Sensing transducers 38 and 40 may be mounted radially from the mounting bracket 28 on support arms 39, 41, respectively. These sensors 38, 40 are, preferably, located at the position adjacent to the maximum measurable deflection of the loop 18 created by the reaction of the fluid to the transverse acceleration created by the driver 32. Typically this position is a along the circumference of the loop 18, approximately 90° from the driver 32. These sensors or switches may take any known form such as linear, optical, etc.

In an alternate embodiment of this invention a piezo transducer type sensor 38', 40' may be directly attached to the loop 18 (as shown in FIG. 8) or mounted by a clip (not shown) rather than be supported on arms 39, 41. Although any type sensing mechanism may be utilized these piezo self referencing sensors, which are accelerometers, are preferred. This type of sensing transducer, particularly shown in FIGS. 4a and 4b, converts high mechanical vibrational energy into an electrical pulse where the relative motion of the loop 18 becomes proportional to the acceleration of the tube 10 at the reference position. The piezo transducer is generally used together with a low pass filter to eliminate vibrational frequency components in the neighborhood of the natural resonance frequency. Such filtering may be performed simultaneously by a microprocessor while calculating the mass flow calculations.

Figures 4A, 4B:
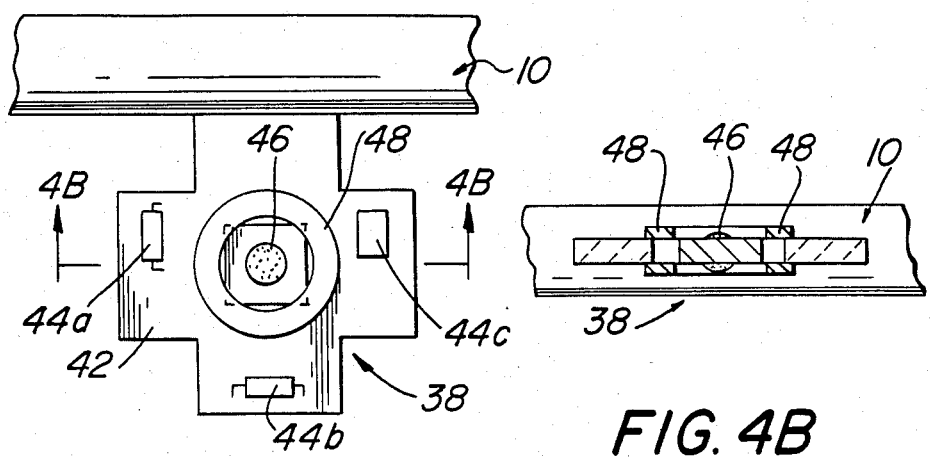
FIGS. 4a and 4b show an alternate sensor embodiment mounted directly on the flow meter conduit.

The mechanical structure of a typical accelerometer is shown in FIGS. 4a and 4b. A ceramic body piece 42 is formed with its electrical components 42a, 42b, 42c being mounted within a thick film or directly onto the only surface. The ends of the sensor 38 are mounted to the conduit wall 10. The body 42 is provided with a central, typically, tungsten filled epoxy mass 46. The central mass 46 is mounted to a film which is supported on the body 42 by washer 48. The alternating deflections of the loop 18 due to the reaction forces of the fluid move the central mass 46 in alternating directions placing the piezo element crystal in alternating tension and compression modes. The output of this arrangement produces an electrical signal simulating the deflection signature of the fluid reaction forces on the conduit 10.

It is desired that the physical dimensions of the loop be such that its natural resonant frequency does not correspond to the resonant frequencies of machinery found in the surrounding environment or utilized in the process line. Typical industrial machinery operates at a resident frequency of 50-60 Hz. The combination of these environmental vibrations on the operating flow meter may create substantial discrepancies in the measurements of the sensing transducers 38, 40.

The alternate embodiments of the invention included in FIGS. 5 and 6 show, generally, a loop 18 and 118, respectively, formed substantially in a single plane (Y-Z plane). The imparted oscillation created by the driver(s) 32 in these figures is parallel to the X-axis 16, perpendicular to the fluid flow within the loop 18 and 118 and substantially perpendicular to the Y-Z plane. Thus the deflections of both sides of the loop are basically away from the Y-Z plane although this plane is not particularly referenced by the sensors.

The embodiment in FIG. 6 includes a second driver 32' which is mounted from the bracket 28 by a second support arm 30'. The two drivers impart 32, 32' deflections of the single plane loop 18' such that the loop 18' is deflected substantially simultaneously away from the Z-axis 22. Again, this axis is not referenced by the sensors 38', 40' for a proper calculation of the mass flow.

Both embodiments of the flow meter in FIGS. 5 and 6 utilize the substantially free floating loop design having a reduced spring constant. The torsional bending of the loop 18' is reduced as compared to the alternate embodiment 18 (in FIGS. 1-3) since the conduit is in the same plane and not spiraled about the X-axis.

FIG. 9 shows the integrated reaction forces (Fm and Fm') on the loop 18 in response to the transverse imparted deflection (VC). This integrated reaction force (Fm) is basically the same for all embodiments shown in the drawings and creates a torque (Tm) substantially about the Y-axis 20.

OPERATION

In operation, a fluid stream is supplied to the inlet 12, travels around loop 18, and is returned into the stream through the outlet 14. The fluid is subject to an alternating transverse acceleration caused to the loop 18 by the excitation of the driver 32. A maximum deflection occurs in one direction and then a reverse deflection occurs to a similar maximum. The transverse acceleration imparted to the fluid flowing in the conduit 10 results in reaction force which deflects the loop 18, on opposite sides of the driver 32, away from its stationary position. The sensors 38, 40 (or 38', 40') are preferably positioned at points of maximum displacement of the loop 18 caused by this fluid reaction force.

The deflection of the loop is measured with respect to time in order to determine the signature of both sides of the loop 18 due to the osciliating accelertion force. The transverse acceleration of the flowing mass within the loop 18 will cause a differential deflection on opposite sides of the driver 32. The deflection of the loop 18 between the inlet portion 24 and the driver 32 will lag or lead the deflection between the driver 32 and the outlet portion 26 depending on the oscillation directions. This is due to the spatial accelerations and decelerations of the mass flow in these respective loop 18 segments. The signature information provided by the sensors 38, 40 with respect to this phase motion of the loop 18 is fed into a microprocessor. Noise vibrations can be removed simultaneously from these signals as can an indication of the validity of the signature cycle. The sensor data may then be directly correlated to determine the mass flow. Each of these calculations and electronic filterings can be performed by any suitable technique.

Suitable sensing means can be of either the analog or digital type. Analog sensors are used to measure the phase difference of the differential deflection of the two sides of the loop 18. Information relating to the phase of the two simultaneous outputs cancels the effects of structural changes in the physical positioning of a loop 18 with respect to the sensing system. This type sensing system dynamically responds to structure variations in the flow meter due to the changes in ambient conditions and, also, to common dynamic continuous or spike vibrational effects.

The electrical circuitry utilized to control the energization of the driving transducers and to measure the loop 18 deflections, its time phase relationship to the driving force, and to receive and process the resulting signals may be performed in a microprocessor. The driver circuit is a conventional mechanical feedback multivibrator which runs at the resonant frequency of the mass being driven. Typically, A MOSFET bridge excites the coil which drives the magnet. Conventional coil/acceleometer feedback can be used but a combination of piezo/coil or piezo/crystal can be used to eliminate some electromagnetic common mode noise.

Since it has become clear that mechanical noise is affecting known flow meters, it is desirable to produce a narrow band signal to eliminate unwanted noise caused by vibrations actually sensed by the sensors. This is in addition to differential noise cancellation between the sensors and the driver. The narrow band filters at the output of the piezo x-tal type preamp should be very tightly matched in characteristics and physically tied together for temperature tracking, so that any phase shift in the filters will be identical and the integrity of the desired mechanical phase shift is maintained.

In a circular design common industrial environmental vibrations effect the loop 18 equally at all locations rather than to one portion to a greater extent than another. The temperature and vibration error, which unequally effect different portions of the apparatus in known Coriolis type flow meters, may cause the offset zero reading during calibration and use of these known meters. The structure of this invention inherently provides the, so called, common mode rejection of these environmental vibrations and substantially increases the sensitivity and accuracy of the meter. The free floating design, therefore, permits the application of the invention in otherwise normally unacceptable industrial environments.

The present invention may be embodied in other specific forms without departing from the spirit or essential attributes thereof and, accordingly, reference should be made to the appended claims, rather than to the foregoing specification, as indicating the scope of the invention.

We claim:

1. An apparatus for measuring the mass flow of a fluid stream comprising: a conduit having an inlet end and an outlet end, each said end fixed with respect to one another and positioned substantially along a single axis; a substantially free-floating continuous flow tube forming at least one loop spiraled between said inlet and said outlet ends, whereby the continuous flow tube is substantially free of restrictions or constraints along its spiraled length offset from the single axis, and said loop being symmetrical about said single axis between said fixed inlet and outlet ends; a driving transducer imparting an oscillation to said loop in a direction perpendicular to the flow within said loop and parallel to the single axis; and means for sensing the deflections of said loop in response to the reaction of the flow to the oscillation of said driving transducer, said sensing means positioned in opposite radial directions from said driving transducer along the periphery of said loop.

2. An apparatus as claimed in claim 1 further comprising a support beam positioned substantially along said axis between said inlet end and said outlet end; and a mounting bracket on said beam and in the plane of said loop, said bracket having a plurality of radially extending arms for support of said driving transducer and said sensing means.

3. An apparatus as claimed in claim 1 further comprising a second driving transducer positioned diametrically opposite of the first mentioned transducer on said loop and imparting a corresponding oscillation to said loop in substantially the same rotational direction as said first mentioned transducer.

4. An apparatus as claimed in claim 1 wherein said driving transducer comprises an electromagnetic coil excited by an alternating electrical current, said output of said coil having a frequency corresponding to the natural resonant frequency of the loop, such that the oscillation of the of the loop induces the corresponding Coriolis reaction force from the fluid with said loop.

5. An apparatus as claimed in claim 1 wherein said sensing means comprises an accelerometer mounted directly onto the conduit loop, said accelerometer being substantially immune to common mode vibrations unrelated to the fluid reaction against the loop.

6. An apparatus as claimed in claim 1 further comprising a support beam attached to said inlet end and said outlet end and extending substantially along said axis passing through the plane of said loop, said loop being spiraled concentrically about said support beam.

7. An apparatus as claimed in claim 1 wherein the periphery of said spiraled loop is substantially circular when viewed along said single axis.

8. An apparatus as claimed in claim 7 wherein said circular portion of said loop is formed substantially in a single plane.

9. An apparatus as claimed in claim 1 wherein said loop is formed in a single plane substantially perpendicular to said single axis.

10. An apparatus for measuring the mass flow of a fluid in a defined fluid stream or pipeline comprising: a conduit having an inlet end for receiving the flow from the fluid stream and an outlet end for returning the flow to the fluid stream, said inlet end and said outlet end positioned substantially along an axis defined by the defined fluid stream or pipeline, said conduit substantially free of restrictions or constraints for at least a portion of its length between the inlet end and the outlet end, said portion including a free floating continuous circular shaped loop, said loop lying substantially in a plane perpendicular to the axis with said axis passing through the center of the circle formed by said loop; a support beam positioned along said axis and passing through said loop, said support beam connected at respective opposite ends thereof adjacent said inlet end and said outlet end; a mounting bracket attached to said support beam at a position substantially in the plane of said loop, said bracket having a plurality of radially extending arms; at least one driving transducer mounted on one said arm and positioned adjacent to said loop said driving transducer imparting an oscillatory displacement to said loop, the displacement imparted in a direction substantially parallel to the axis line; and means for sensing the deflections of said loop due to the reaction of the flow against said loop in response to the oscillatory displacement, said means sensing said reaction without reference to a specific preset or fixed position of said loop, said sensing means mounted on said radially extending arms at positions adjacent the loop and displaced equidistant and in opposite directions from said driving transducer along the periphery of said loop.

11. An apparatus as claimed in claim 10 further comprising: a second driving transducer mounted on one of said radially extending arms and positioned adjacent to said loop diametrically opposite from the first mentioned driving transducer, said pair of driving transducers imparting oscillatory displacement to said loop in the same rotational direction about the center of said loop.

12. An apparatus as claimed in claim 11 wherein said sensing means includes a pair of piezo electric transducer type accelerometers.

13. An apparatus for measuring the mass flow within a pre-existing defined fluid stream, by measuring Coriolis reaction forces of the fluid on the apparatus, comprising: means defining a conduit having an inlet and an outlet for receiving and exhausting flow from the fluid stream, said inlet and outlet positioned substantially in a straight line and each positioned along the defined fluid stream; a continuous flow tube including a substantially free floating loop formed between said inlet and said outlet, said loop being substantially symmeterical about and substantially free of restrictions or constraints along its periphery offset from said straight line and having a first and second gently bent portions, said first portion for directing the flow from said inlet into said loop, said second portion for directing the flow from said loop into said outlet; a support beam extending substantially along said straight line and attached at opposite ends to said conduit means adjacent said inlet and said outlet; means for imparting an oscillation perpendicular to the flow at a point on said loop, means for sensing the movement of the loop due to the reaction of the fluid to said oscillation means, said sensing means positioned adjacent to the periphery of said loop and displaced equally and in opposite directions along said periphery from said oscillation means on said loop.

14. An apparatus for measuring the mas flow of a fluid stream comprising: a conduit having an inlet end and an outlet end positioned substantially along a single axis line and fixed with respect to one another; a substantially continuous flow tube spiraled about said axis line, said spiral of said flow tube having a loop of an arc of at least 270° formed about said axis line, an inlet section for directing the flow into the loop from the inlet end of the conduit and an outlet section for directing the flow from the loop into the outlet end of the conduit, the flow tube being substantially free of restrictions or constraints along its continuous length so as to be substantially free-floating between said inlet and outlet ends; means to oscillate the flow tube transverse to the direction of flow within said loop; and means to sense the reaction of the flow on said free-floating flow tube in response to the imparted oscillation, said sensing means positioned on opposite sides of said oscillation.

* * * * *